United States Patent [19]

Kawasumi et al.

[11] 4,309,458

[45] Jan. 5, 1982

[54] PROCESS OF PRODUCING COMPOSITE POWDER COATED WITH NOBLE METAL

[75] Inventors: Yoshio Kawasumi, Urawa; Mitsuo Takahashi, Tokyo, both of Japan

[73] Assignee: Nihon Kogyo Kabushiki Kaisha, Tokyo, Japan

[21] Appl. No.: 84,014

[22] Filed: Oct. 11, 1979

[30] Foreign Application Priority Data

Oct. 16, 1978 [JP] Japan ................................ 53-126170

[51] Int. Cl.³ .............................................. B05D 5/00
[52] U.S. Cl. ...................................... 427/217; 75/231; 428/403
[58] Field of Search ...................... 252/12, 26; 75/231; 428/570, 403; 427/214, 217

[56] References Cited

U.S. PATENT DOCUMENTS 3,956,528 5/1976 Ugro ................................... 427/496

*Primary Examiner*—Sam Silverberg
*Attorney, Agent, or Firm*—Seidel, Gonda, Goldhammer & Panitch

[57] ABSTRACT

Composite powder coated with a noble metal is produced by adding a powder of a metal or alloy baser than the noble metal to a powder of a metallic sulfide, carbon, activated charcoal, metallic carbide, or metallic oxide, and then adding to the resulting mixture a solution containing the noble metal with stirring. The particles of the composite powder are coated with the noble metal that results from a cementation reaction.

11 Claims, No Drawings

PROCESS OF PRODUCING COMPOSITE POWDER COATED WITH NOBLE METAL

BACKGROUND OF THE INVENTION

This invention relates to a process of producing composite powder which consists of particles of a metallic sulfide, carbon, activated charcoal, metallic carbide, metallic oxide or the like coated with a noble metal. As used throughout this description, the term "noble metal" is intended to embrace gold, silver, and platinum group metals.

Articles made by blending a noble metal powder and a powder of a metallic sulfide such as molybdenum disulfide or tungsten disulfide, carbon powder of amorphous carbon or graphite, powder of a metallic carbide such as tungsten carbide, titanium carbide, or silicon carbide, or powder of a metallic oxide such as tin oxide or silver oxide and then compacting and sintering it to shape have found extensive applications as, for example, electric contacts, metallic brushes, sliding contactors, and oilless bearings. Also in practice are mixing such a blended powder with a synthetic resin to a paste form and applying the paste on an insulation substrate to produce a coated film layer of low resistance. Further, activated charcoal coated with silver is in use for ozone reduction.

Mere mixing of such a powder of a metallic sulfide, carbon, activated charcoal, metallic carbide, or metallic oxide with a noble metal powder will not give a uniformly dispersed system, and when the mixture is compacted and sintered to be a resistor, for example, the product will show wide irregularity in resistivity. In another application as a sliding contactor, it will fail to provide adequate slidability or contact resistance.

Therefore, in an effort to obtain sintered bodies of thoroughly dispersed powder mixtures, it has been proposed to form composite powder by coating the individual particles of one of the aforementioned powders with a noble metal by chemical reduction plating and then to sinter a green compact of the composite powder. The composite powder gives a sintered body of good quality, because of improved uniformity in dispersion and added strength on sintering. For example, when carbon powder and gold or siver powder are blended with synthetic resin, the employment of the composite powder of carbon and gold or silver will improve the homogeneity of the mixed system, and the compounding ratio of the carbon and gold or silver can be closely controlled by regulating the thickness of gold or silver coating.

In chemical reduction plating of the aforesaid powders with noble metals, the methods thus far proposed have required some pretreatment, such as a sensitizing or activation treatment. In addition, the plating solution is very expensive. A more recent proposal, made in Japanese Patent Application Public Disclosure No. 39403/1977, pertains to silver coating of carbonaceous powder. According to the method, the powder of a carbonaceous substance is placed in a silver nitrate solution to occlude the latter, an organic acid salt is added to the silver nitrate solution so as to convert silver nitrate to an organic acid salt of silver, the resultant is filtered to obtain a carbonaceous substance that has occluded the organic acid salt of silver, the carbonaceous substance is thrown into pure water, and then a reducing agent such as a hydrazine solution is added to it thereby to reduce the occluded organic acid salt of silver. The method has drawbacks, however. The amount of silver coating varies with the surface area to be plated of the carbonaceous particles, and is especially influenced by the existence of micropores. The salt used will be partly left behind in the micropores, adversely affecting the quality of the product in subsequent steps of processing. The chemicals to be employed are expensive and call for very complicated processing procedure.

In view of these, there has been a great need in the art for the development of a method for coating a powder of a metal sulfide, carbon, activated charcoal, metallic carbide, or metallic oxide with a noble metal through a simplified process without the necessity of a special pretreatment or an expensive chemical agent.

We have already proposed in our copending Japanese Patent Application No. 134726/1977 a process for coating metal sulfide particles with copper by a cementation reaction. The process was directed only to the combinations of metal sulfides and copper. After further investigations it has now been confirmed that such cementation technique is also applicable to coating of the above-mentioned powders with noble metals.

SUMMARY OF THE INVENTION

Thus, according to the invention a process of producing a composite powder coated with a noble metal is provided, which comprises adding a powder of a metal or alloy electrochemically baser than the noble metal to a powder of a metallic sulfide, carbon, activated charcoal, metallic carbide, or metallic oxide, and then adding to the resulting mixture a solution containing said noble metal with stirring, whereby said powder particles are coated with said noble metal that results from a cementation reaction.

DETAILED DESCRIPTION

The invention will now be described in more detail.

For the practical purposes the powdery materials that can be coated with noble metals in accordance with the invention are metallic sulfides such as molybdenum disulfide and tungsten disulfide, carbons including amorphous carbon and graphite, activated charcoal, metallic carbides such as tungsten carbide, titanium carbide, and silicon carbide, and metallic oxides such as tin oxide silver oxide. These materials in powder form are hereinafter called "starting powders" or "core powders".

As regards the particle size of a given core powder to be coated, there is no particularly rigid limitation. However, a size in the range of 20-2000μ will give good result. If the particles are coarser or finer than this range, there will be a tendency of the degree of coating with a noble metal decreasing more or less.

Sources of noble metals for the coating purpose may be nitrates, hydrochlorides, sulfates, ammonium salts, organic acid salts, cyanates, and mixtures of these salt systems. Such salts achieve substantially the same effects provided they take the form of soluble salts. The ion concentration of a given noble metal for coating use is not definitely specified, because it varies with the particle size of the core powder and the thickness of coating on the particles. Usually, however, the concentration may range from 0.5 g/l to the saturation point. As the solvent, water may be employed.

For the reaction with the noble metal ions, the baser metal or alloy powder should be a suitable one chosen in consideration of the composition of the solution containing the particular noble metal. When economy, efficiency of reaction, and other factors are taken into account, desirable metals include tin, zinc, iron, copper, aluminum, and magnesium. The particle size should be selected in proportion to that of the core powder. For example, where a core powder ranging in particle size from 200 down to 40μ is to be used, the optimum size of the baser metal powder ranges from 150 down to 30μ. The proper amount of the baser metal powder to be added is believed to be slightly more, say about 1.01 times larger, than the stoichiometric equivalent of the intended amount of the noble metal that is to cover the core powder.

In the operation, the reaction vessel is charged with a core powder and an amount of a metal or alloy powder calculated on the basis of the desired amount of a noble metal for coating. The vessel must be provided with means for producing an adequate stirring action. To attain the end, a vessel equipped with blades which will create a planetary motion may be employed. While the two components are being thoroughly mixed, a noble metal solution is added. This is desirably done in such a way that the addition up to the realization of the funicular [II] region takes a long period, for example, from 20 seconds to 10 minutes, and then the slurry region is reacted in a short period of from 5 to 20 seconds. The terms "funicular region" and "slurry region" as used herein mean two of five different stages of solid-liquid systems classified and indicated, in a known practice, according to the degrees of packing and fluidity. For reference the five stages defined by the indication method are tabulated below:

| Region | Solid phase | Liquid phase | Condition | Fluidity |
| --- | --- | --- | --- | --- |
| (1) Pendular | Continuous | Discontinuous | Loose | Dilatant dispersion |
| (2) Funicular [I] | " | Continuous | " | Pseudo-plastic dispersion |
| (3) Funicular [II] | " | " | " | Plastic dispersion |
| (4) Capillary | Discontinuous | " | Viscous | Shear Hardened dispersion |
| (5) Slurry | Discontinuous | " | Muddy | False body dispersion |

The periods of time required for reaching the funicular and slurry regions vary with the sizes and amounts of the powders, agitation efficiency, and other factors. The noble metal solution is desirably added batchwise so as to add to the uniformity of the mixture. Following the addition of a desired amount of the noble metal solution, stirring of the mixture is kept on, for example, for about 30 seconds. After the stirring, the resulting composite powder is recovered. Under the invention the amount of the noble metal to be applied can be controlled within the limits of the aimed value plus or minus 0.3%.

The core powder is often too fine or contains a large proportion of unusually flat or angular grains or has an excessively broad range of particle size, depending on the source from which it is derived. In such cases, preliminary granulation and sizing of the granules or particles will prove highly beneficial. By way of example, the core powder may be ground and granulated by a grinding-granulating mixer, such as a Henschel mixer, using a binder prepared by diluting a resol or novolak type phenol resin with alcohol. The resulting grains are sieved. The repetition of the procedure permits eventual granulation and sizing of all the material powder to the predetermined size.

The metal or alloy powder for the cementation reaction, as noted above, may be any one baser than the noble metal to be used. Of those baser metal powders, copper powder is most preferred. However, copper powder is so expensive that the possibility of recovery should be a requisite for its use. It has now been found, as the basis of the present invention, that the copper ions in the solution after the cementation reaction for noble-metal coating can be precipitated and separated as copper powder by cementation with the baser and inexpensive iron powder, and the copper powder thus obtained may be reused in the noble-metal coating. When this step of recycling is incorporated in the process of the invention, what is consumed is practically only the low-priced iron powder and this renders it possible to reduce the cost for preparing composite powder. The noble metal-coated composite powder made by using the regenerated copper powder is as satisfactory in quality as the powder that uses the original copper powder.

EXAMPLE 1

With the view to forming a graphite-silver composite powder in which the silver coating would account for 50% of the total weight, 1000 g of graphite (marketed by Nippon Graphite Co. under the trade designation "CB-150") and 297 g of a copper powder ("#34" marketed by the Assignee of this application) placed into an agitation tank equipped with blades for planetary motion. The amount of the copper powder was 1.01 times as much as the theoretical chemical equivalent needed for the precipitation of 1000 g of silver ions. While the mixture was being stirred, an aqueous nitrate solution with a silver concentration of 150 g/l was added little by little, and a funicular [II] region was formed in about 30 seconds. The whole mixture was vigorously agitated for about 10 seconds, and then the remainder of the aqueous nitrate solution required was added over a period of about 10 seconds to produce a complete slurry region. After a total of 6667 cc of the aqueous nitrate solution was added, stirring was continued for an additional period of about 30 seconds. Washing and drying of the resultant yielded 2000 g of a silver-coated graphite powder. After the coating, no residual silver ion was found in the solution. The individual particles were silver white with uniform silver coating. The silver content of the powder was 49.8% by weight.

This powder was pressed in a die with a pressure of 1.5 t/cm$^2$, and the green compact so obtained was sintered at 700° C. The sintered body had a specific resistance of 30 μΩ-cm. An optical microscopic image of the sintered body showed a silver coating layer having an uninterrupted network or meshes with uniform width.

EXAMPLE 2

In order to obtain a molybdenum disulfide-silver composite powder consisting of a molybdenum disulfide powder coated with 50% by weight of silver, silver coating was carried out in the same way as described in Example 1 except that a molybdenum disulfide powder of the Technical Fine grade manufactured by Amax Co. was used. The individual particles of the powder were uniformly silver-coated and were silver white. The silver content of the powder was 49.9%.

The powder so obtained was pressed in a die with a pressure of 1.5 t/cm² and the green compact was sintered at 700° C. The sintered body, with a specific resistance of 505 μΩ-cm, possessed a silver coating layer with a network or meshes of uniform width like that of Example 1.

As will be understood from the foregoing description, the present invention does not call for any special pretreatment or costly chemical agent but permits the manufacture of a noble-metal-coated composite powder by a simplified process within a short period of time. The composite powder thus produced is one whose individual core particles are evenly coated over the entire surfaces with a noble metal in an accurately controlled amount within the limits of plus or minus 0.3% of the aimed coating amount. The composite powder then gives products of high quality for subsequent uses as sintered bodies or the like.

What is claimed is:

1. A process of producing a composite powder coated with a noble metal, which comprises adding a powder of a metal or alloy baser than the noble metal to a starting powder of a metallic sulfide, carbon, activated charcoal, metallic carbide, or metallic oxide, and then adding to the resulting mixture a solution containing said noble metal with stirring, whereby said starting powder particles are coated with said noble metal that results from a cementation reaction.

2. A process according to claim 1 wherein the starting powder has a particle size between about 20μ and 2000μ.

3. A process according to claim 1 wherein the solution containing noble metal is a solution of nitrates, hydrochlorides, sulfates, ammonium salt, organic acid salts or cyanates of noble metal and the combination thereof.

4. A process according to claim 3 wherein the solution is an aqueous solution.

5. A process according to claim 1 wherein the solution containing noble metal has a noble metal concentration of about 0.5 g/l to saturation value.

6. A process according to claim 1 wherein the metal or alloy powder baser than noble metal is selected from a group of powders of tin, zinc, iron, copper, aluminum, magnesium, or an alloy thereof.

7. A process according to claim 1 wherein copper is selected as the metal baser than noble metal, and copper ions in the solution after the cementation reaction for the noble metal coating is recovered as copper powder by the cementation reaction with iron powder and the copper powder thus obtained is reused.

8. A process according to claim 1 wherein the addition of the solution containing noble metal ion is so effected that the funicular region is reached in about 20 seconds to 10 minutes and then the slurry region is reached in 5 to 10 seconds.

9. A process according to claim 1 wherein when the starting powder is subjected to preliminary granulation and sizing.

10. A process according to claim 9 wherein said preliminary granulation and sizing is effected by charging the starting powder into the grinding-granulating mixer together with a binder prepared by diluting a resol and/or novolak type phenol resin with alcohol, to grind and granulate the powder, evaporating the alcohol, sieving the resultant granules, returning into the mixer to coarse and fine particles outside the intended range with only addition of alcohol and repeating said procedure until all the starting powder is sized to the intended range.

11. A process of producing a composite powder coated with a noble metal comprising the steps of:
    providing preliminarily granulated and sized starting powder of a metallic sulfide, carbon, activated charcoal, metallic carbide or metallic oxide,
    mixing the starting powder with powder of a metal or alloy baser than the noble metal, and
    adding to the mixture produced solution containing said noble metal in such manner that the funicular (II) region is reached in about 20 seconds to 10 minutes and then the slurry region is reached in 5 to 10 seconds,
    whereby the starting powder particles are coated with noble metal that results from a cementation reaction.

* * * * *